United States Patent [19]
Fiorido

[11] Patent Number: 5,501,366
[45] Date of Patent: Mar. 26, 1996

[54] SINGLE-SEED DISPENSER OF A PNEUMATIC PRECISION SOWER

[75] Inventor: Antonino F. Fiorido, Pordenone, Italy

[73] Assignee: Matermacc S.r.l., Pordenone, Italy

[21] Appl. No.: 277,314

[22] Filed: Jul. 22, 1994

[30] Foreign Application Priority Data

Jul. 29, 1993 [IT] Italy .................. PN93A0057

[51] Int. Cl.$^6$ .................................................. B23Q 7/04
[52] U.S. Cl. ................................................ 221/211; 111/77
[58] Field of Search .................... 221/211, 178, 221/266; 111/77, 78, 185

[56] References Cited

U.S. PATENT DOCUMENTS

| | | | |
|---|---|---|---|
| 3,990,606 | 11/1976 | Gugenhan | 221/211 |
| 4,074,830 | 2/1978 | Adams et al. | 221/266 |
| 4,449,642 | 5/1984 | Dooley | 221/211 |
| 5,377,867 | 1/1995 | Schick et al. | 111/77 |

FOREIGN PATENT DOCUMENTS

| | | |
|---|---|---|
| 0338883 | 10/1989 | European Pat. Off. . |
| 2643212 | 8/1990 | European Pat. Off. . |
| 0536543 | 4/1993 | European Pat. Off. . |
| 1145917 | 11/1986 | Italy . |
| 2132395 | 7/1984 | United Kingdom . |

*Primary Examiner*—Kenneth Noland
*Attorney, Agent, or Firm*—Wenderoth, Lind & Ponack

[57] ABSTRACT

A single-seed dispenser of a pneumatic precision sower includes a seed supply container, a housing defining a suction chamber, and rotatable perforated dispenser disc interposed between the supply container and the housing. At least one partition member is disposed at the rear surface of the disc in the housing wherethrough air is aspirated for drawing the seeds onto the disc. The partition member(s) covers only portions of the perforations at least over the circumferential extent of the disc over which suction in the suction chamber acts through the perforations. Thus, elongate very narrow seeds are prevented from passing through the perforations. A drive disc for driving the dispenser disc includes pins projecting through bores in the dispenser disc not only to transmit rotation of the driver disc to the dispenser disc but also to agitate the seeds in the bottom of the seed supply container. A stripper for stripping excess seeds from the dispenser disc includes two spaced apart plates. One of the plates has a crenulate edge overlying the perforations on the side of the disc facing the seed supply container. The disc extends into a recess defined between the plates and positions the stripper correctly by guiding the same at a surface of the stripper defining the bottom of the recess.

20 Claims, 3 Drawing Sheets

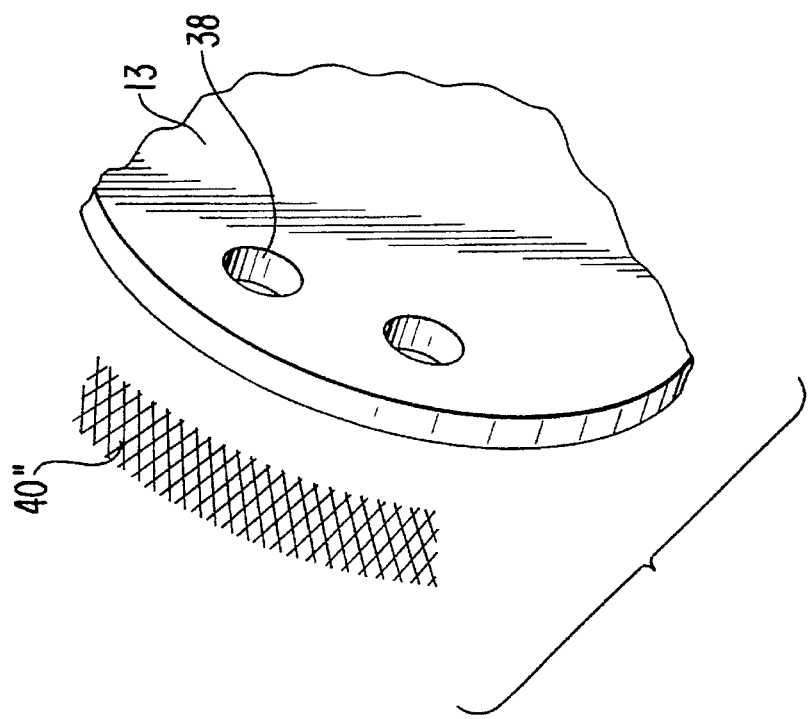
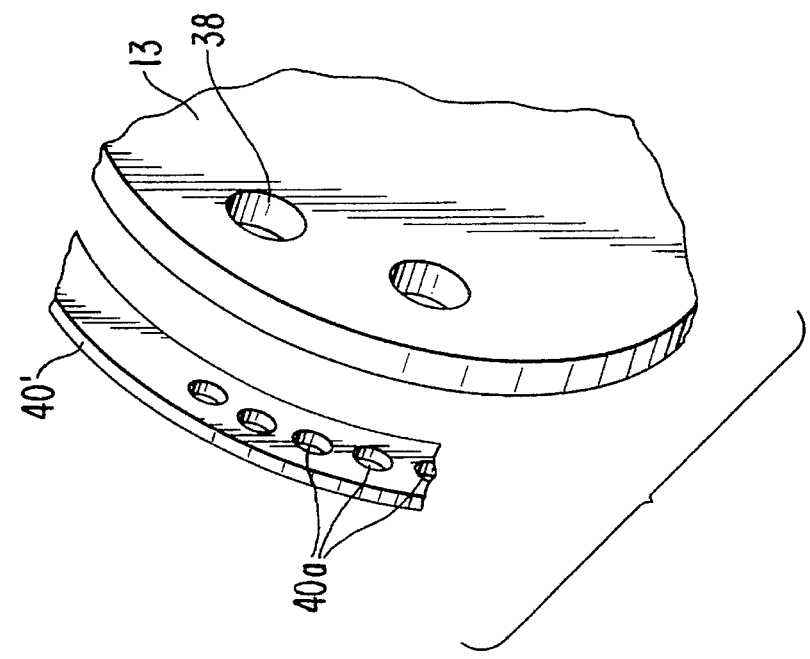

SINGLE-SEED DISPENSER OF A PNEUMATIC PRECISION SOWER

BACKGROUND OF THE INVENTION

1. Field of the Invention

The present invention relates to precision sower operable to deposit individual seeds in the ground at regular intervals along a drill line.

Precision sowers are know to be employed specifically for the cultivation of corn, sugar beets, soya beans, vegetables, and in general for the cultivation of any crop whose seeds, nude or encapsulated, must be deposited at regular intervals. In comparison to the universal type of sowers, precision sowers offer various advantages: a reduction or even elimination of the time otherwise required for the thinning out of the seedlings, simplification of the cultivation and harvest operations, and considerable savings of seeds to be dispensed.

Precision sowers are substantially divided into two categories on the basis of the dispensing system employed, namely, a mechanic and a pneumatic system.

The present invention is directed to precision sowers of the pneumatic type in which the extraction of the seeds from a supply container, their separation and their individual release are accomplished by means of a rotating disc which is provided with one or more concentric circular rows of perforations, a suction fan creating a vacuum through the perforations of the disc effective to retain the seeds on the disc, and a mechanical stripper stripping surplus seeds from the disc to return the seeds to the supply container to thereby ensure the discharge of individual seeds.

2. Description of the Related Art

With known precision sowers in which the perforations of the disc are substantially circular, it is difficult to achieve the retention of only one seed at each perforation of the disc, particularly when the seeds are irregularly shaped. For this reason there is a tendency to employ a disc with oversized perforations to thereby ensure the retention of at least one seed at each perforation. Although the size of the perforations is effective to ensure the retention of even large seeds, comparatively small seeds may pass through the perforations or a number of small seeds may become so jammed in a perforation as to obturate it. It is difficult to strip such surplus seeds from the disc while leaving only a single seed at each perforation, and seeds jammed in a perforation may be damaged by the stripper cooperating with the perforated disc. To relieve these problems, it is customary to provide the sower with a number of interchangeable discs having perforations of different sizes for adaptation to seeds of different shapes and average sizes.

In addition, the stripper has to be positionable and adjustable so as to ensure the retention of only a single seed at each perforation. In known sowers this feat is impossible to accomplish in the case of irregularly shaped seeds because an adjustment which permits the separation of two smaller seeds at a single perforation may frequently lead to a larger seed being stripped off the disc, resulting in a gap in the drill line. On the other hand, an adjustment of the stripper ensuring the retention on the disc of larger or incorrectly positioned grains would permit more than one seed of a smaller size to be retained at a single perforation, resulting in an irregular seed distribution.

Italian Patent No. 1,145,917 discloses a precision sower of the pneumatic type in which the seeding disc comprises two parts, namely, a disc body connected to the suction fan, and a disc sheet contacting and covering the disc body on its side facing the seed supply. The disc body is stationary and provided with a spiral guide groove extending from its center to its outer periphery to define a seed ejection path. The disc sheet is rotatable and provided with a plurality of radial grooves extending from a center location to the periphery of the disc. With this structure, seeds may be withdrawn from the supply container at a slower speed to thereby facilitate the retention of the seeds on the disc. On the other hand, the radial grooves have to be adequately spaced for permitting the seeds to adhere to the disc at a relatively small central area thereof, whereby the number of these grooves is limited. As a result, only a small number of seeds is dispensed during each revolution of the disc, whereby the sowing operation has to be carried out at a very slow speed of advance. If the sowing operation were carried out more quickly, the seeds would be subjected to excessive centrifugal forces. This system functions well with round seeds but is less satisfactory for dispensing irregularly shaped seeds, for instance elongate seeds or seeds having varying dimensions.

In addition, this dispenser is structurally complex as it requires a disc of two parts each provided with particular slots and grooves. From a functional point of view, as the seeds come into contact with both parts of the disc, they are forced to undergo a rolling motion which, although promoting the separation of the seeds, may result in their being damaged by their frictional contact with the surfaces of the two parts of the disc over a considerable distance.

European Patent Application EP-A-0 338 883 discloses a precision sower of the pneumatic type in which the dispenser disc is provided with equidistant circular perforations disposed along one or two circular rows adjacent the outer periphery of the disc. A characteristic of the dispenser of this sower is that the vacuum system includes an internal passage having a varying cross section and divided into two branches, one of which is provided with a closure element operable to isolate it from the suction fan. In one embodiment, the dispenser disc is provided with circular perforations disposed along two circular rows, and a series of blades alternating with the perforations and acting to agitate the seeds in the container and to convey them from the point whereat the vacuum retention terminates to the point whereat the seeds are dropped to the ground. In this embodiment, as the seeds pass from one of the circular rows of perforations to the other, the individual seeds separate from one another independently, within certain limits, of the size and the shape of the seeds. On the other hand, it is evident that the space occupied by the blades between adjacent perforations limits the number of perforations which can be provided in each circular row, and thus also the number of seeds that can be dispensed during each revolution of the disc. This again implies that the speed of advance in the field is limited in order to prevent an excessively high rotational speed of the disc with its negative effects on the seeds due to centrifugal forces. Finally, this system is rather expensive.

In a second embodiment, similar to conventional pneumatic precision sowers, the disc is not provided with blades. Rather, a stripper which has rectilinear incisions and is adjustable in position relative to the perforations of the disc is provided so that the seeds retained on the disc by the vacuum strike the projections of the stripper and are thus separated into individual seeds. In any case, the dispenser of this sower also offers merely limited advantages. The circular perforations of the dispenser disc may, on the other hand, not have a diameter large enough to prevent seeds from becoming jammed therein or from passing therethrough, nor may they, on the other hand, have a small diameter because in this case the vacuum might be insufficient for withdrawing the seeds from the supply hopper. In addition, the efficiency of the stripper is unsatisfactory in the case of seeds having irregular shapes and sizes.

Similar sowers are disclosed in FR-A-2 643 212, GB-A-2 132 395, U.S. Pat. No. 3,990,606 and U.S. Pat. No. 4,074, 830.

European Patent Application EP-A-0 536 543 of the present Applicant discloses a pneumatic precision sower having a dispenser disc provided with perforations and cooperating with a seed supply container and an air aspiration system. The perforations of the disc are elongate. A stripper cooperates with the disc by overlying areas of the perforations. This dispenser solves to a substantial degree the problems of the above-described state of the art sowers but does not fully eliminate the problem relating to elongate, very narrow seeds (for instance, certain hybrid corn seeds, sunflower seeds and the like) which may still get caught in or pass through the perforations of the dispenser disc.

SUMMARY OF THE INVENTION

It is therefore the main objects of the present invention to provide an improved precision sower of the pneumatic type which reduces the number of discs required for adapting the sower to different kinds of seeds, and in particular, which prevents elongate, very narrow seeds from passing through the perforations of the dispenser disc.

To achieve these objects, the dispenser of the pneumatic precision sower of the present invention includes at least one partition member adapted to intersect the perforations of the disc at least over a circumferential distance corresponding to the sector wherealong the aspiration of air through said housing is effective.

It is another object of the present invention to provide a pneumatic type of sower which can employ a set of simpler interchangeable dispenser discs.

To achieve this object, the dispenser disc(s) has a series of bores extending therethrough. A drive disc includes a main rotary body driven for rotation by the power source of the sower, and a plurality of pins extending through the bores and into a seed supply container of the sower. The pins not only transmit rotation from the drive disc to the dispenser disc but also agitate the seeds in the bottom of the seed supply container.

Another object of the present invention is to provide a pneumatic type of sower having a stripper that is positioned correctly relative to the perforations in the dispenser disc.

To achieve this object, the stripper includes a pair of integral plates having portions spaced from one another so as to define a recess therebetween. The surface of the stripper defining the bottom of the recess is curved, and preferably complementary to the profile of the periphery of the dispenser disc. The disc extends into the recess such that the periphery of the disc acts to guide the stripper to an appropriate location relative to the perforations of the disc during the rotation of the disc.

BRIEF DESCRIPTION OF THE DRAWINGS

The characteristics and advantages of the present invention will become more clearly evident from the following description, given by way of example with reference to the accompanying drawings, wherein:

FIG. 3a is a schematic diagram of an alternative form of a partition member employed by the present invention; and FIG. 3b is a schematic diagram of another alternative form of the partition member.

DETAILED DESCRIPTION OF THE PREFERRED EMBODIMENTS

Figure 1:
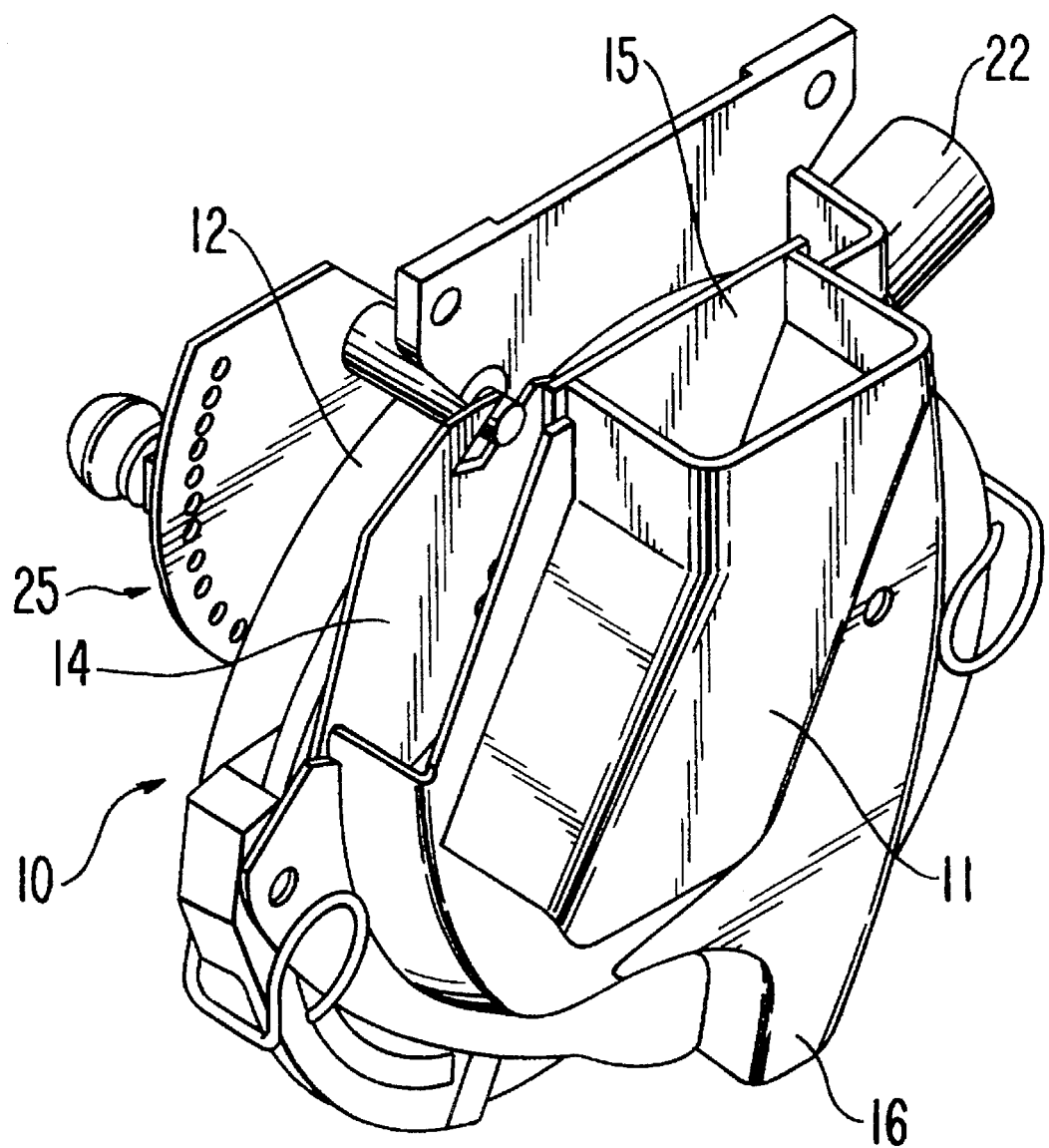
FIG. 1 is a perspective view of an embodiment of an essential part of a precision sower according to the present invention.

The single-seed dispenser 10 according to the invention may be used to equip any type of known sower.

The dispenser 10 substantially consists of a seed supply container 11, a hollow housing 12, a perforated dispenser disc 13 interposed between container 11 and housing 12, and a stripper 14 operatively associated with disc 13.

The seed supply container 11 has an upper portion comprising a seed charging hopper 15, and a lower portion comprising a discharge chute 16 for guiding the dispensed seeds towards the ground. Container 11 further includes flanges 18, 19 having holes which receive respective pins 181 and 191 of housing 12. The container 11 and housing 12 define an enclosed space therebetween. Housing 12 is connected to an air aspiration device (for instance a motorized suction blower of a known and therefore not shown type) by a suction conduit 22 opening, through a port 23 (FIG. 2), into a suction chamber 24 formed in a sector of the interior of the housing 12. The suction chamber 24 is open to the disc 13 which is enclosed between container 1 and housing 12.

A manual adjuster arm is mounted on the housing 12. The manual adjuster arm has a setting plate 25 and rotates an eccentric pin 26 or acts on a functionally equivalent component for adjusting the position of the stripper 14 as will be explained later on.

A hub of housing 12 has a bore 27 extending therein. A shaft 29 is rotatably supported by the hub via bearings 28. The shaft 29 is adapted to be rotated by, for instance, a motor-transmission assembly (not shown) connected to a gear or sprocket 30 fixed to the shaft 29. A driver disc 31 also fixed to the shaft 29 acts to transmit the rotation of the shaft to the dispenser disc 13.

The seed supply container 11 and housing 12 are held together by clamp hooks 52 mounted in suitable bores (not shown) formed in the rim of housing 12 and detachably engaging flanges 18 and 19 of the seed supply container 11. Sealing gaskets 50, 51 are interposed between the container 11 and housing 12.

Figure 2:
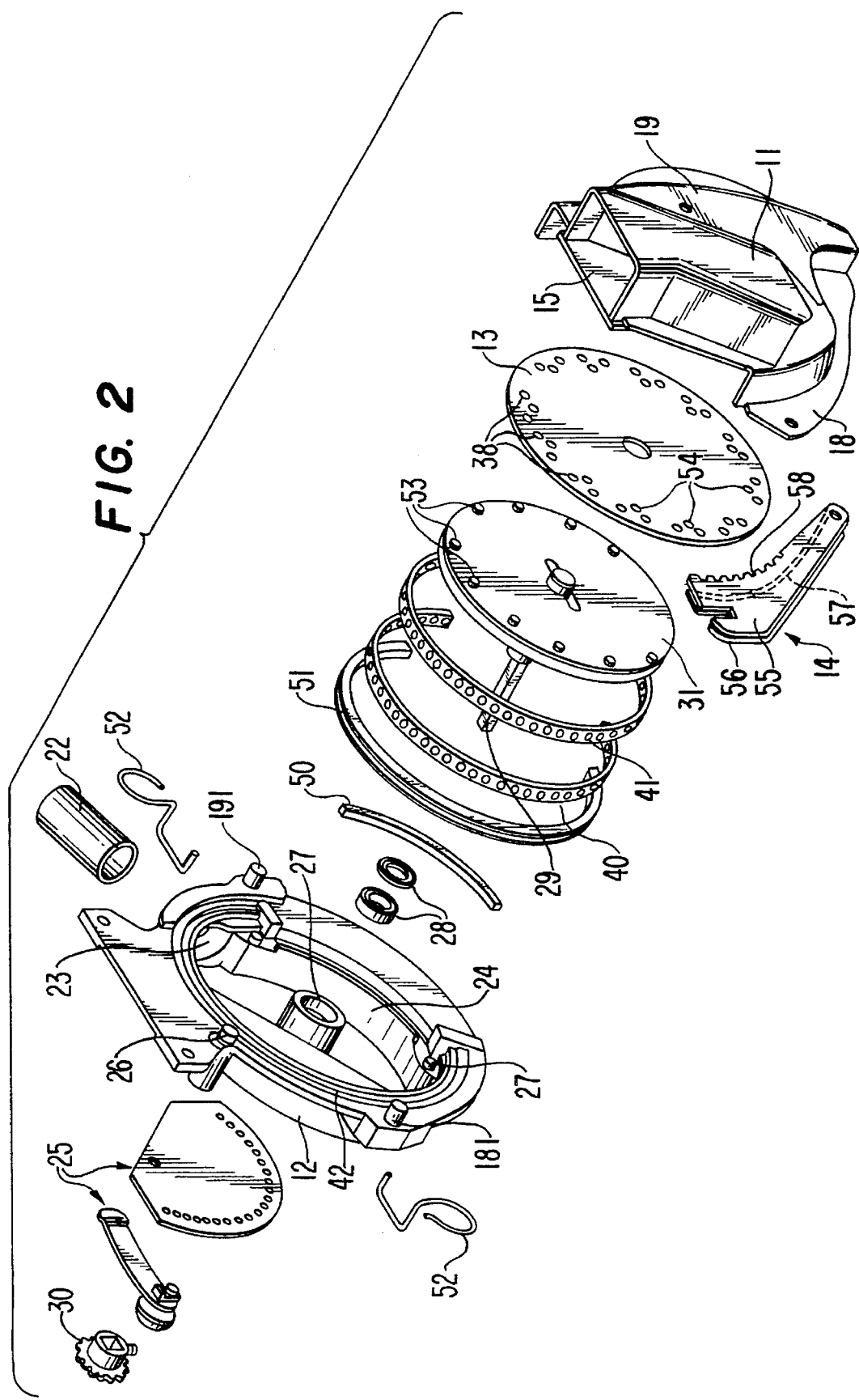
FIG. 2 is an exploded view of the same.

According to the invention, at least one partition member (two such members 40 and 41 are shown in FIG. 2) is mounted in a complementary seat 42 formed in housing 12. This member(s) is annular to a given extent and has a diameter greater than that of driver disc 31, its circumferential edge extending along a circumferential line along which the dispenser disc 13 is formed with perforations 38. This edge extends at least over the circumferential extent of the disc 13 over which air is aspirated through the perforations 38. In the embodiment shown in FIG. 2, annular or quasi-annular partition members 40 and 41 are formed of metal or plastic sheet material and lie substantially perpendicular to the adjacent surface of disc 13 so as to cover portions of the perforations 38 as the disc rotates. The two members 40 and 41 have different diameters, of course, and are disposed concentrically to one another. The members 40 and 41 may obviously be replaced by a partition member in the form of a quasi- or completely annular sheet 40' having holes 40a of diameters smaller than those of perforations 38, respectively, and disposed parallel to the surface of disc 13 to thereby obtain the same effect when the small holes 40a lie over perforations 38 (FIG. 3a). In a still further modification, members 40 and 41 may be replaced by a quasi- or completely annular screen 40" of a suitably calibrated mesh, the screen also disposed parallel to the surface of disc 13 (shown schematically in FIG. 3b).

As will be readily understood, because the partition member(s) effectively intersects or subdivides the open ends of perforations 38 in disc 13, the member(s) prevents seeds having an elongate very narrow shape, within a certain range, from passing through the perforations 38 independently of the dimensions of perforations 38.

This reduces the number of interchangeable discs 13, having perforations of different dimensions, required to adapt the sower to the great variety of seeds to be dispensed.

Another important characteristic of the apparatus according to the invention resides in the discs 13 and 31. In known sowers, the side of disc 13 facing towards container 11 is provided with agitator elements adapted to act on the seeds descending from hopper 15 to thereby facilitate their vacuum-retention in the perforations 38. In the embodiment of the dispenser according to the present invention, however, the driver disc 31 is instead provided with a circumferentially spaced array of pins 53 extending from the main body of the disc shown in FIG. 2. These pins 53 are received in corresponding bores 54 formed in the dispenser disc 13, and project therethrough towards container 11. The pins 53 agitate the seeds in container 11 in addition to transmitting the rotation of the driver disc 31 to the dispenser disc 13. This imparts a simple structure to the apparatus by eliminating the necessity of providing agitator elements on each of the various discs 13.

Another important feature of the present invention resides in the stripper 14 cooperating with the disc 13. As shown in FIG. 2, the stripper 14 comprises two sheet-like members 55 and 56 fixedly connected to one another so as to define a recess 57 therebetween as indicated by the dotted lines in FIG. 2. The circumferential edge of the disc 13 is received in the recess 57 so that stripper 14 is steadily guided by the disc as the disc rotates between the two sheet members 55 and 56. This ensures maximum efficiency and precision in the single-seed dispensing operation.

The stripper 14 may of course have an edge overlying the perforations and configured to strip excess seeds from the disc 13. More specifically, the stripper 14 may have a conventional crenelate portion 58 which ensures that only single seeds are retained at each of the perforations 38 of the disc 13.

The stripper 14 is pivotably mounted at one end thereof to the housing 12 by a pin 27 fixed to housing 12 and received in the hole shown in the lower end of the stripper 14 in FIG. 2. The position of the stripper 14 is adjustable by the eccentric pin 26 and adjuster arm 25.

The pin 26, having an outer circumference eccentric to the rotational axis thereof, is received in the slot shown in the top of the stripper 14 in FIG. 2. Actuation of the adjuster arm 25 causes the eccentric pin 26 to be rotated to thereby pivot stripper 14 and adjust the position of stripper 14 relative to the dispenser disc 13 and its perforations 38 in accordance with the seeds to be dispensed. The displacement and adjustment of the stripper 14 may be accomplished by means other than the eccentric pin 26 such as screws, levers or sliding members.

In operation, after the container 11 has been charged with seeds, the disc 13 is set in rotation (clockwise as viewed in FIG. 2), and the air aspiration system is activated. The aspiration of air through conduit 22, port 23, chamber 24 and perforations 38 causes the seeds to be entrained by the disc 13 for rotation therewith. As the thus entrained seeds pass the crenelate portion 58 of the stripper 14, surplus seeds are progressively stripped from the disc 13, so that a single seed will be retained in each perforation 38 as it reaches the downstream end of the serrated portion 58, provided that the stripper 14 has been properly adjusted. The seeds are thus retained on disc 13 until the respective perforations reach a release position adjacent discharge chute 16 and at a downstream terminal end of suction chamber 24, whereat the seeds are no longer subjected to the suction.

It is finally to be noted that the present invention can be readily applied to existing dispensers, particularly with regard to the partition members 40 and 41 which, in effect, partition the perforations 38 of the dispenser disc 13. All that is required for this purpose is to form the seats for these elements in the housing 12 by a simple machining operation.

Of course, various changes and modifications will readily become apparent to those of ordinary skill in the art. All such changes and modifications are seen to be within the true spirit and scope of the invention as defined by the appended claims.

What is claimed is:

1. A single-seed dispenser of a pneumatic precision sower, comprising:

a seed supply container;

a housing defining a suction chamber therein, said housing being joined to said seed supply container;

a dispenser disc interposed between said seed supply container and said housing and rotatably supported in the dispenser, one surface of said dispenser disc facing said seed supply container and the other surface of said dispenser disc facing said vacuum chamber, and said dispenser disc having a series of perforations extending therethrough at the other outer circumference thereof;

a stripper having an edge overlying said perforations at said one surface of the disc, said edge being configured to strip excess seeds from adhering to the disc at each one of said perforations; and at least one partition member mounted in said housing and covering only portions of said perforations at said other surface of the disc over at least a circumferential extent of the dispenser disc over which suction in the suction chamber acts through said perforations to draw seeds to said one surface of the disc, to thereby limit the effective size of openings constituted by said perforations and through which seeds of a given size can pass.

2. A single-seed dispenser as claimed in claim 1, wherein said at least one partition member comprises a rigid sheet lying perpendicular to said other surface of said disc, said sheet having an edge covering said only portions of said perforations as the dispenser disc rotates.

3. A single-seed dispenser as claimed in claim 1, wherein said at least one partition member comprises a sheet disposed parallel to said other surface of said disc, said sheet having holes therein located over said perforations as said disc rotates so that said sheet covers said only portions of said perforations.

4. A single-seed dispenser as claimed in claim 3, wherein said holes have diameters, respectively, smaller than those of said perforations, the entirety of each of said holes becoming located over respective ones of the perforations at said other surface of the disc as said disc rotates.

5. A single-seed dispenser as claimed in claim 1, wherein said partition member is a screen lying parallel to said other surface of the disc, said screen having a mesh smaller than the size of said perforations.

6. A single-seed dispenser as claimed in claim 1, wherein said dispenser disc also has a plurality of bores extending therethrough, and further comprising a drive disc rotatably supported in the dispenser, said drive disc having a main rotary body adjacent said other surface of the dispenser disc, and pins extending from said main rotary body through said bores and beyond said one surface of the dispenser disc, whereby said pins agitate seeds in a lower portion of said seed supply container.

7. A single-seed dispenser as claimed in claim 2, wherein said dispenser disc also has a plurality of bores extending therethrough, and further comprising a drive disc rotatably supported in the dispenser, said drive disc having a main rotary body adjacent said other surface of the dispenser disc, and pins extending from said main rotary body through said bores and beyond said one surface of the dispenser disc, whereby said pins agitate seeds in a lower portion of said seed supply container.

8. A single-seed dispenser as claimed in claim 3, wherein said dispenser disc also has a plurality of bores extending therethrough, and further comprising a drive disc rotatably supported in the dispenser, said drive disc having a main rotary body adjacent said other surface of the dispenser disc, and pins extending from said main rotary body through said bores and beyond said one surface of the dispenser disc, whereby said pins agitate seeds in a lower portion of said seed supply container.

9. A single-seed dispenser as claimed in claim 4, wherein said dispenser disc also has a plurality of bores extending therethrough, and further comprising a drive disc rotatably supported in the dispenser, said drive disc having a main rotary body adjacent said other surface of the dispenser disc, and pins extending from said main rotary body through said bores and beyond said one surface of the dispenser disc, whereby said pins agitate seeds in a lower portion of said seed supply container.

10. A single-seed dispenser as claimed in claim 5, wherein said dispenser disc also has a plurality of bores extending therethrough, and further comprising a drive disc rotatably supported in the dispenser, said drive disc having a main rotary body adjacent said other surface of the dispenser disc, and pins extending from said main rotary body through said bores and beyond said one surface of the dispenser disc, whereby said pins agitate seeds in a lower portion of said seed supply container.

11. A single-seed dispenser as claimed in claim 1, wherein said stripper includes two integral plates spaced from one another to define a recess therebetween, said stripper having a curved surface defining the bottom of said recess, and the periphery of the dispenser disc extends into said recess, whereby the stripper is guided by said dispenser disc during its rotation.

12. A single-seed dispenser as claimed in claim 2, wherein said stripper includes two integral plates spaced from one another to define a recess therebetween, said stripper having a curved surface defining the bottom of said recess, and the periphery of the dispenser disc extends into said recess, whereby the stripper is guided by said dispenser disc during its rotation.

13. A single-seed dispenser as claimed in claim 3, wherein said stripper includes two integral plates spaced from one another to define a recess therebetween, said stripper having a curved surface defining the bottom of said recess, and the periphery of the dispenser disc extends into said recess, whereby the stripper is guided by said dispenser disc during its rotation.

14. A single-seed dispenser as claimed in claim 4, wherein said stripper includes two integral plates spaced from one another to define a recess therebetween, said stripper having a curved surface defining the bottom of said recess, and the periphery of the dispenser disc extends into said recess, whereby the stripper is guided by said dispenser disc during its rotation.

15. A single-seed dispenser as claimed in claim 5, wherein said stripper includes two integral plates spaced from one another to define a recess therebetween, said stripper having a curved surface defining the bottom of said recess, and the periphery of the dispenser disc extends into said recess, whereby the stripper is guided by said dispenser disc during its rotation.

16. A single-seed dispenser as claimed in claim 6, wherein said stripper includes two integral plates spaced from one another to define a recess therebetween, said stripper having a curved surface defining the bottom of said recess, and the periphery of the dispenser disc extends into said recess, whereby the stripper is guided by said dispenser disc during its rotation.

17. A single-seed dispenser of a pneumatic precision sower, comprising:

a seed supply container;

a housing defining a suction chamber therein, said housing being joined to said seed supply container;

a dispenser disc interposed between said seed supply container and said housing and rotatably supported in the dispenser, one surface of said dispenser disc exposed to the interior of said seed supply container at a lower portion of the container and the other surface of said dispenser disc facing said vacuum chamber, said dispenser disc having a series of perforations extending therethrough at the outer circumference thereof and said dispenser disc having a plurality of bores extending therethrough, said perforations being in open communication with said suction chamber during a rotation of said dispenser disc such that seeds in said lower portion of said seed supply container will adhere to said one surface of said disc at said perforations when a vacuum is created in said suction chamber; and a drive disc rotatably supported in the dispenser, said drive disc having a main rotary body adjacent said other surface of the dispenser disc, and pins extending from said main rotary body through said bores and beyond said one surface of the dispenser disc, whereby said pins agitate seeds in said lower portion of said seed supply container.

18. A single-seed dispenser as claimed in claim 17, wherein said dispenser disc is supported by the main rotary body of the drive disc via said pins such that said pins transmit rotation of said drive disc to said dispenser disc to rotate said dispenser disc.

19. A single-seed dispenser of a pneumatic precision sower, comprising:

a seed supply container;

a housing defining a suction chamber therein, said housing being joined to said seed supply container;

a dispenser disc interposed between said seed supply container and said housing and rotatably supported in the dispenser, one surface of said dispenser disc facing said seed supply container and the other surface of said dispenser disc facing said vacuum chamber, said dispenser disc having a series of perforations extending therethrough at the other outer circumference thereof and said dispenser disc having a plurality of bores extending therethrough; and a stripper including two integral plates spaced from one another so as to define a recess therebetween, one of said plates having an edge overlying said perforations at said one surface of the disc, said edge being configured to strip exceed seeds from adhering to the disc at each one of said perforations, and said stripper having a curved surface defining the bottom of said recess, the periphery of said dispenser disc extending into said recess and guiding said stripper at said surface defining the bottom of said recess during rotation of said disc.

20. A single-seed dispenser as claimed in claim 19, wherein said surface of the stripper defining the bottom of said recess has a shape complementary to the profile of a portion of the periphery of said dispenser disc.

* * * * *